US011226262B2

(12) United States Patent
Brunel et al.

(10) Patent No.: US 11,226,262 B2
(45) Date of Patent: Jan. 18, 2022

(54) APPARATUS FOR TESTING A SHAFT AND/OR A MECHANICAL PART ON THE SHAFT AND USE OF SUCH AN APPARATUS

(71) Applicants: MG-VALDUNES, Trith Saint Leger (FR); Université de Lille, Lille (FR)

(72) Inventors: Florent Brunel, Ligny-les-Aire (FR); Philippe Dufrénoy, Chereng (FR); François Demilly, Lambersart (FR)

(73) Assignees: MG-VALDUNES, Trith Saint Leger (FR); Université de Lille, Lille (FR)

( * ) Notice: Subject to any disclaimer, the term of this patent is extended or adjusted under 35 U.S.C. 154(b) by 286 days.

(21) Appl. No.: 16/343,733

(22) PCT Filed: Oct. 23, 2017

(86) PCT No.: PCT/EP2017/077000
§ 371 (c)(1),
(2) Date: Apr. 19, 2019

(87) PCT Pub. No.: WO2018/073451
PCT Pub. Date: Apr. 26, 2018

(65) Prior Publication Data
US 2019/0271613 A1   Sep. 5, 2019

(30) Foreign Application Priority Data

Oct. 21, 2016 (FR) ..................................... 16 60234

(51) Int. Cl.
*G01M 13/027* (2019.01)
*G01N 3/20* (2006.01)
(52) U.S. Cl.
CPC ............ *G01M 13/027* (2013.01); *G01N 3/20* (2013.01)

(58) Field of Classification Search
CPC ......... G01M 13/027; G01N 3/20; G01N 3/22; G01N 3/02
See application file for complete search history.

(56) References Cited

U.S. PATENT DOCUMENTS 3,305,935 A * 2/1967 Cady .......................... G01L 5/28
                                                             33/203.13
3,889,541 A * 6/1975 Langlois .................. G01M 1/04
                                                             73/460
(Continued)

FOREIGN PATENT DOCUMENTS

CN        103175702 A     6/2013
DE    102010027897 A1    10/2011
(Continued)

OTHER PUBLICATIONS

International Search Report for PCT Application No. PCT/EP2017/077000, dated Jan. 16, 2018 in 5 pages.
(Continued)

*Primary Examiner* — Nathaniel T Woodward
*Assistant Examiner* — Philip L Cotey
(74) *Attorney, Agent, or Firm* — Knobbe, Martens, Olson & Bear, LLP (57) ABSTRACT

This device comprises an immobilizing device of a first portion of the shaft, the shaft extending along a first axis, and a movement device of a second portion of the shaft so as to load the shaft in bending. The moving device comprises a first cylinder, a second cylinder, and a connecting device configured to form, between the shaft and one end of the first cylinder, a first connection prohibiting a translation perpendicular to the first axis and allowing a rotation around the first axis, and to form, between the shaft and one end of the second cylinder or between the end of the first cylinder connected to the shaft and one end of the second cylinder, a (Continued)

second connection prohibiting a translation perpendicular to the first axis and allowing a rotation around a second axis parallel to the first axis.

14 Claims, 8 Drawing Sheets

(56) References Cited

U.S. PATENT DOCUMENTS

| | | | | |
|---|---|---|---|---|
| 3,937,076 A * | 2/1976 | Pommellet | ......... | G01M 17/022 |
| | | | | 73/146 |
| 4,133,201 A * | 1/1979 | Klinger | ......... | B60G 11/00 |
| | | | | 73/12.01 |
| 4,263,809 A * | 4/1981 | Petersen | ......... | G01M 13/027 |
| | | | | 73/116.01 |
| 4,501,139 A * | 2/1985 | Petersen | ......... | G01M 17/06 |
| | | | | 73/115.01 |
| 4,656,872 A * | 4/1987 | Fischer | ......... | G01N 3/20 |
| | | | | 73/850 |
| 4,862,738 A | 9/1989 | Jankowski | | |
| 5,018,757 A * | 5/1991 | Kozuka | ......... | B60G 3/26 |
| | | | | 280/5.523 |
| 5,072,611 A * | 12/1991 | Budd | ......... | G01M 13/045 |
| | | | | 73/115.07 |
| 5,083,453 A * | 1/1992 | Daley | ......... | G01M 13/027 |
| | | | | 73/115.07 |
| 5,527,079 A * | 6/1996 | Catot | ......... | B60B 17/0017 |
| | | | | 295/7 |
| 5,533,403 A * | 7/1996 | Haeg | ......... | G01M 13/027 |
| | | | | 73/669 |
| 5,806,634 A * | 9/1998 | Engle | ......... | B61H 13/36 |
| | | | | 188/220.1 |
| 6,000,491 A * | 12/1999 | Shimizu | ......... | B62D 6/10 |
| | | | | 180/444 |
| 7,690,264 B2 * | 4/2010 | Robinson | ......... | G01N 3/20 |
| | | | | 73/812 |
| 7,942,046 B2 * | 5/2011 | Jones | ......... | G01M 17/04 |
| | | | | 73/118.03 |
| 8,056,406 B2 * | 11/2011 | Goto | ......... | G01M 15/044 |
| | | | | 73/117.01 |
| 8,960,015 B2 * | 2/2015 | Klaffert | ......... | G01M 99/007 |
| | | | | 73/856 |
| 2002/0171555 A1 * | 11/2002 | Kochersberger | .... | G01M 13/025 |
| | | | | 340/683 |
| 2004/0177701 A1 * | 9/2004 | Zubok | ......... | A61F 2/468 |
| | | | | 73/804 |
| 2011/0041617 A1 * | 2/2011 | Cotrell | ......... | G01M 7/06 |
| | | | | 73/660 |
| 2014/0116123 A1 * | 5/2014 | Jensen | ......... | G01M 13/025 |
| | | | | 73/112.01 |
| 2017/0059452 A1 * | 3/2017 | Fischer | ......... | G01M 17/10 |

FOREIGN PATENT DOCUMENTS

| | | |
|---|---|---|
| DE | 102014106086 A1 | 11/2015 |
| EP | 0112400 A1 | 7/1984 |
| EP | 2927660 A1 | 10/2015 |
| FR | 2365117 A1 | 4/1978 |
| JP | H04-52545 A | 2/1992 |

OTHER PUBLICATIONS

French Search Report for Application No. FR1660234, dated Jun. 29, 2017 in 3 pages.

* cited by examiner

APPARATUS FOR TESTING A SHAFT AND/OR A MECHANICAL PART ON THE SHAFT AND USE OF SUCH AN APPARATUS

CROSS-REFERENCE TO RELATED APPLICATIONS

This application is the U.S. National Phase under 35. U.S.C. § 371 of International Application PCT/EP2017/077000, filed Oct. 23, 2017, which claims priority to French Patent Application No. 16 60234, filed Oct. 21, 2016. The disclosures of the above-described applications are hereby incorporated by reference in their entirety.

FIELD OF THE INVENTION

The present invention relates to the field of apparatuses for testing a shaft and/or a mechanical part mounted on the shaft, for example a wheel mounted on the shaft.

BACKGROUND OF THE INVENTION

Railway vehicle bogies are provided with axles, each axle comprising two coaxial wheels supported by a shaft, each wheel being provided to roll on a respective rail of a railroad track. The body of the railway vehicle bears on the shaft, which in turn bears on the wheels.

Due to the distances between the bearing points of the body on the shaft on the one hand, and the wheels on the other hand, the shaft experiences substantial flexural stresses. Furthermore, due to the rotation of the shaft when the bogie rolls along the railway track, the shaft undergoes repeated flexion/deflection cycles, which causes fatigue of the shaft over time.

For safety reasons, when designing a railway vehicle axle shaft, it is necessary to perform flexion tests, and in particular bending fatigue tests.

SUMMARY OF THE INVENTION

It is also possible to test a railway vehicle wheel fitted on the shaft.

One aim of the invention is to propose a device for testing a shaft and/or a mechanical part mounted on the shaft that is easy to carry out, is reliable, and makes it possible to conduct tests representative of actual usage conditions.

To that end, the invention proposes a device for testing a shaft and/or a mechanical part mounted on the shaft, the device comprising an immobilizing device to immobilize a first portion of the shaft, the immobilized and idle shaft extending along a first axis, and a movement device for moving a second portion of the shaft substantially perpendicular to the first axis, so as to load the shaft in bending, wherein the moving device comprises a first cylinder arranged along a first cylinder axis substantially perpendicular to the first axis, a second cylinder arranged along a second cylinder axis substantially perpendicular to the first axis, and a connecting device for connecting the first cylinder and the second cylinder to the shaft, wherein the connecting device is configured to form, between the shaft and one end of the first cylinder, a first connection prohibiting a relative translation perpendicular to the first axis and allowing a relative rotation around the first axis, and to form, between the shaft and one end of the second cylinder or between the end of the first cylinder connected to the shaft and one end of the second cylinder, a second connection prohibiting a relative translation perpendicular to the first axis and allowing a relative rotation around a second axis parallel to the first axis.

The device may include one or more of the following optional features:

the first connection is a ball joint or an annular linear connection, the center of rotation of which is located on the first axis;

the first connection comprises an end-piece rigidly connected to one end of the first cylinder, the end-piece defining a ball joint housing receiving a ball intended to be mounted on the shaft while being centered on the first axis;

the second axis is separate from the first axis;

the second axis coincides with the first axis;

the second connection is a pivot link, the axis of rotation of which is the second axis;

the second connection is a ball joint or an annular linear connection;

the shaft being idle, the first cylinder axis intersects the first axis and/or the second cylinder axis intersects the first axis;

at least one adapter comprising an orifice to receive the second portion of the shaft and a cylindrical step for mounting the connecting device, the cylindrical step having an outer diameter strictly larger or strictly smaller than the inner diameter of the orifice; and the immobilizing device is configured to immobilize the mechanical part mounted on the first portion of the shaft, in particular a pebble or a railway vehicle wheel fitted on the first portion.

The invention also relates to the use of a device as defined above to test the bending of a shaft, in particular a railway vehicle bogie axle shaft, and/or to test a mechanical part mounted on the shaft, in particular a pebble or a wheel fitted on the shaft.

The use may comprise installing the shaft on the device, reading the dimensions of the movement device, the shaft being idle, calculating control laws of the first cylinder and the second cylinder based on the measured dimensions and a desired trajectory of the second portion of the shaft, and controlling the first cylinder and the second cylinder based on the calculated control laws.

BRIEF DESCRIPTION OF THE DRAWINGS

The invention and its advantages will be better understood upon reading the following description, provided solely as an example, and done in reference to the appended drawings, in which.

DETAILED DESCRIPTION OF THE PREFERRED EMBODIMENTS

Figure 1:
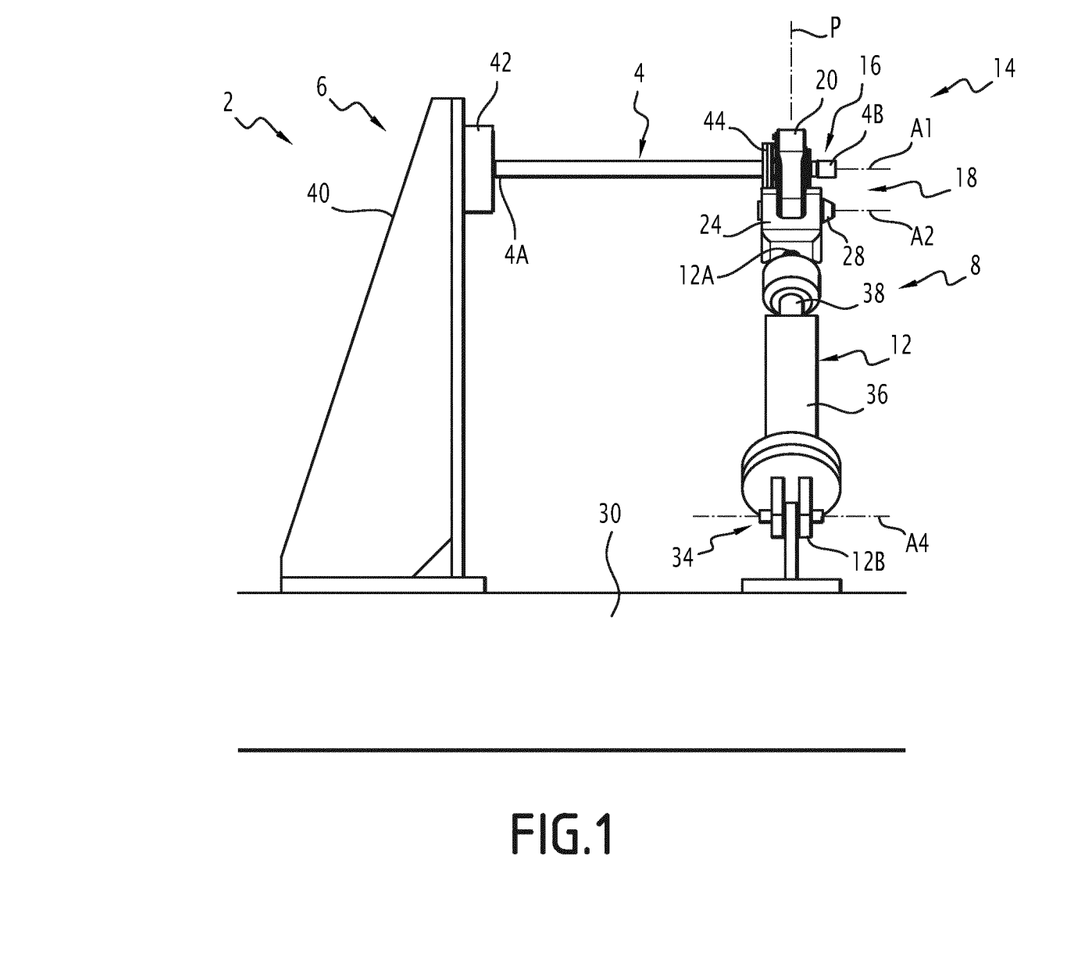
FIGS. 1 and 2 are side and front views of a device for testing the bending of a shaft and/or a mechanical part mounted on the shaft.
Figure 2:
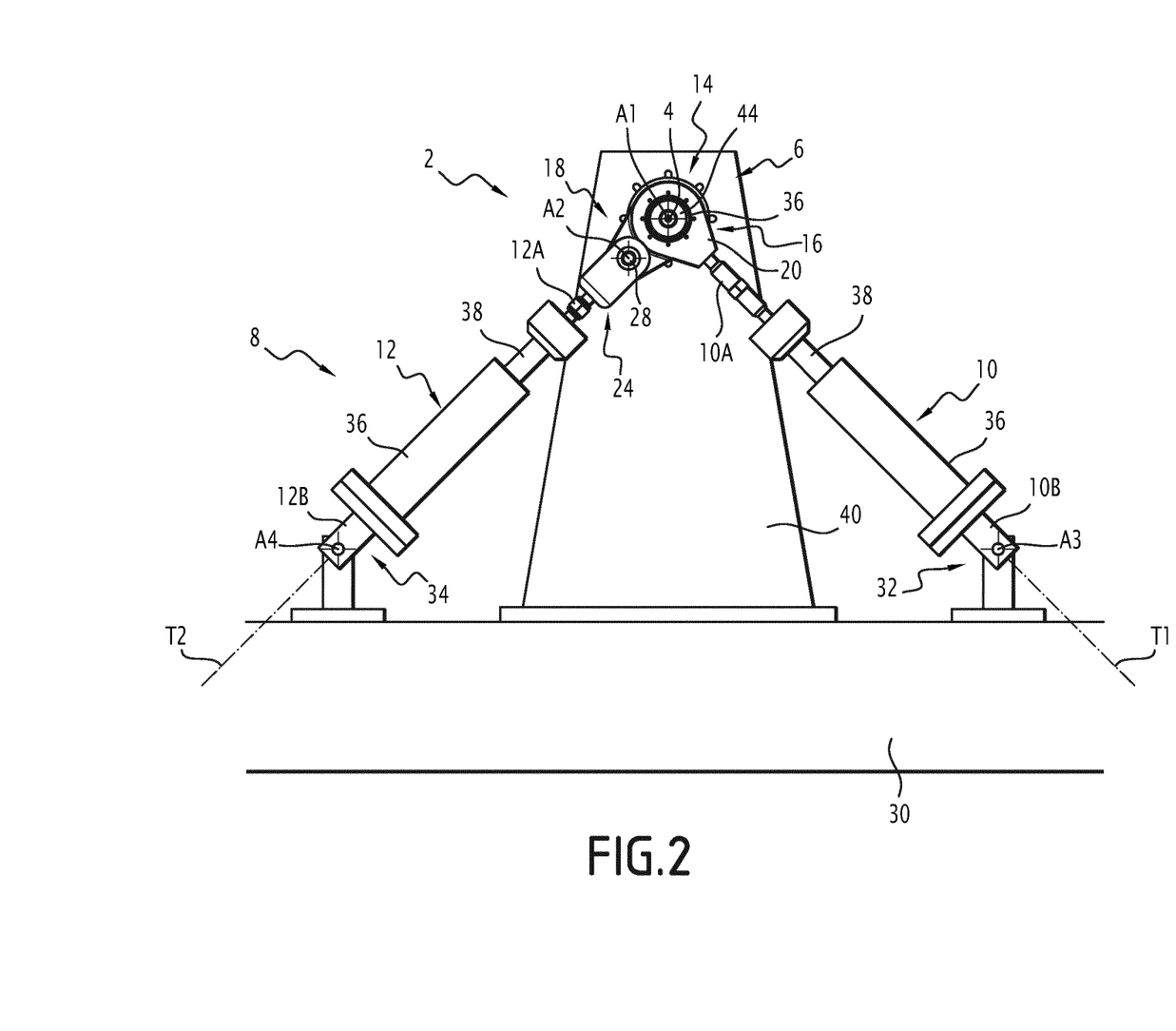

The device 2 shown in FIGS. 1 and 2 is suitable for performing a bending test of a shaft, in particular an axle shaft, and in particular a railway vehicle bogie axle shaft.

In FIGS. 1 and 2, a shaft 4 to be tested is installed on the device 2 and ready to be tested in terms of bending. The shaft 4 is shown when idle, i.e., not loaded in bending.

In the rest of the description, unless otherwise indicated, the positions of the geometric axes and geometric points are indicated for the shaft 4 when idle.

The device 2 comprises an immobilizing device 6 to immobilize a first portion 4A of the shaft 4, the immobilized and idle shaft 4 extending along a first axis A1, and a moving device 8 for moving a second portion 4B of the shaft 4 substantially perpendicular to the first axis A1, so as to urge the shaft 4 to bend.

The first portion 4A of the shaft 4 and the second portion 4B of the shaft 4 are spaced apart from one another along the first axis A1 and the shaft 4. The shaft 4 is loaded in bending between the first portion 4A and the second portion 4B of the shaft 4.

The first portion 4A and the second portion 4B of the shaft here are the two opposite end portions of the shaft 4.

The moving device 8 is configured to move the second portion 4B of the shaft 4 in a movement plane P substantially perpendicular to the first axis A1. In FIGS. 1 and 2, the first axis A1 is substantially horizontal and the movement plane P is substantially vertical.

The moving device 8 comprises a first cylinder 10 arranged along a first cylinder axis T1 substantially perpendicular to the first axis A1, a second cylinder 10 arranged along a second cylinder axis T2 substantially perpendicular to the first axis A1, and a connecting device 14.

The first cylinder 10 has two opposite connecting ends 10A, 10B. The first cylinder 10 is able to generate a rectilinear translation of one connecting end 10A relative to the other 10B along the first cylinder axis T1.

The second cylinder 12 has two opposite connecting ends 12A, 12B. The second cylinder 12 is able to generate a rectilinear translation of one connecting end 14A relative to the other 14B along the second cylinder axis T2.

Preferably, the first cylinder 10 and the second cylinder 12 each preferably have two working directions. In other words, each of the first cylinder 10 and the second cylinder 12 is configured to selectively generate a pulling force or a compression force along its cylinder axis T1, T2, so as to respectively bring the ends of the cylinder 10, 12 closer to or further from one another.

The first cylinder axis T1 is orthogonal relative to the first axis A1. The second cylinder axis T2 is orthogonal relative to the first axis A1. The first cylinder axis T1 and the second cylinder axis T2 extend along the movement plane P. The first cylinder axis T1 and the second cylinder axis T2 form a non-nil angle between them.

In the embodiment of FIGS. 1 and 2, the first cylinder axis T1 and the second cylinder axis T2 are substantially coplanar and extend in the movement plane P.

The connecting device 14 is configured to be arranged between the first cylinder 10 and the second cylinder 12 on the one hand, and the shaft 4 on the other hand, so that the first cylinder 10 and the second cylinder 12 can load the shaft 4 perpendicular to the first axis A1.

The connecting device 14 is configured to form, between the shaft 4 and the end 10A of the first cylinder 10 connected to the shaft 4, a first connection 16 prohibiting a relative translation perpendicular to the first axis A1 and allowing a relative rotation around the first axis A1.

In general, a ball joint allows three rotations around three axes orthogonal to one another intersecting at a center of rotation and prohibits any translation. An annular linear connection authorizes three rotations and a single translation along a single translation axis, while prohibiting translations perpendicular to this translation axis, the center of rotation sliding along the rotation axis. A pivot link authorizes a rotation around a single rotation axis and prohibits any translation. A sliding pivot link allows a rotation around a single rotation axis, and allows a single translation along the rotation axis, while prohibiting translations perpendicular to the rotation axis.

In embodiments, the first connection 16 is a ball joint, the center of rotation of which is located on the first axis, an annular linear connection, the center of translation of which is the first axis A1 and the center of rotation of which is located on the first axis A1, a pivot link, the axis of rotation of which is the first axis A1 or a sliding pivot link, the axis of rotation and translation of which is the first axis A1.

The connecting device 14 is configured to form, between the shaft 4 and the end 12A of the second cylinder connected to the shaft 4 or between the end 10A of the first cylinder 10 connected to the shaft 4 by the first connection 16 and the end 12A of the second cylinder 10 connected to the shaft 4, a second connection 18 prohibiting a relative translation perpendicular to the first axis A1 and allowing a relative rotation around a second axis A2 parallel to the first axis A1.

In embodiments, the second connection 18 is a ball joint, the center of rotation of which is located on the second axis A2, an annular linear connection, the axis of translation of which is the second axis A2 and the center of rotation of which is located on the second axis A2, a pivot link, the axis of rotation of which is the second axis A2 or a sliding pivot link, the axis of rotation and translation of which is the second axis A2.

As illustrated in FIGS. 1 and 2, the connecting device 14 is configured here to form the second connection 18 between the end 10A of the first cylinder 10 connected to the shaft 4 by the first connection 16 and the end 12A of the second cylinder 10 connected to the shaft 4. Furthermore, the second axis A2 is separate from the first axis A1.

The first connection 16 is a ball joint, the center of rotation O of which is located on the first axis A1.

Figure 5:
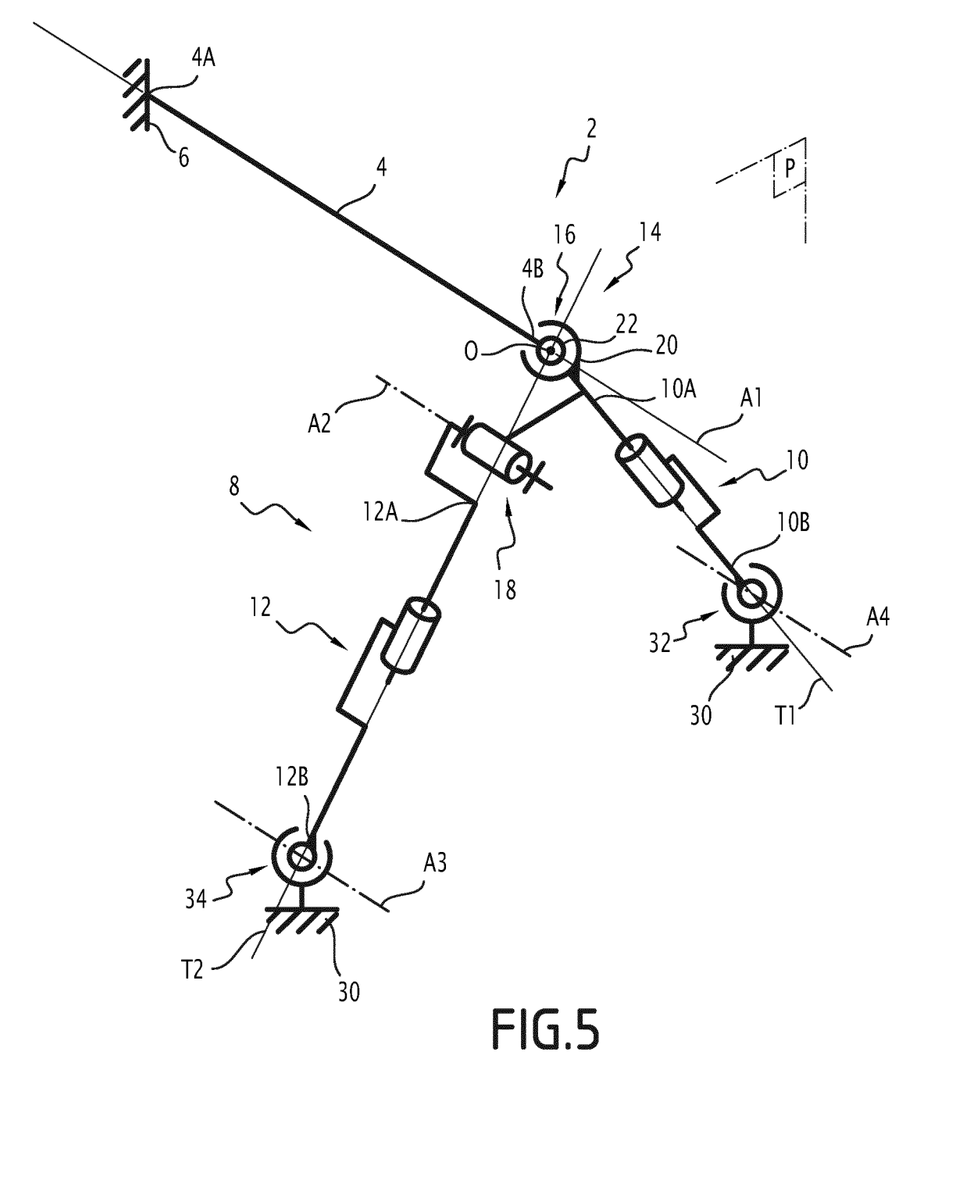
FIGS. 5 to 8 are kinematic perspective diagrams representative of devices for testing the bending of a shaft and/or a mechanical part mounted on the shaft.

The connecting device 14 comprises a first end-piece 20 rigidly fastened to the end 10A of the first cylinder 10, the first end-piece 20 defining a ball joint housing rotatably receiving a ball 22 (FIG. 5). The ball 22 is provided with an orifice for receiving the second portion 4B of the shaft 4, for mounting the ball 22 on the shaft 4. The ball 22 is immobile in translation along the shaft 4.

Alternatively, the first connection 16 is an annular linear connection. To that end, the ball-and-socket joint 22 is mounted on the shaft 4 while being translatable along this first axis A1 relative to the shaft 4. This makes it possible to prevent mechanical stresses from appearing when the shaft 4 is loaded in bending.

In these alternatives, the ball joint can be replaced by a ball rolling bearing arranged in the end-piece, allowing a rotation around a primary rotation axis coinciding with the first axis A1 and allowing rotations of limited amplitude around two rotation axes perpendicular to the primary rotation axis.

The second connection 18 is a pivot link, the second axis A2 being separate from the first axis A1.

The connecting device 14 comprises a second end-piece 24 rigidly fastened to the end 12A of the second cylinder 10, the second end-piece 24 being mounted pivoting on the first end-piece 20 around the second axis A2 via a pivot 28. The end-piece 26 is for example a fork end.

The device 2 comprises a stationary frame 30. The immobilizing device 6 makes it possible to immobilize the first portion 4A of the shaft 4 relative to the frame. The first cylinder 10 and the second cylinder 12 are each arranged between the frame 30 and the connecting device 14 in order to move the second portion 4B of the shaft 4 relative to the frame 30 perpendicular to the first axis A1.

The connecting end 10A of the first cylinder 10 is connected to the shaft 4 via the connecting device 14, and its other end 10B is connected to the frame 30 via a third connection 32 allowing a relative rotation around a third axis A3 parallel to the first axis A1 and prohibiting any translation perpendicular to the third axis A3. The third axis A3 is immobile.

The connecting end 12A of the second cylinder 12 is connected to the shaft 4 via the connecting device 14, and its other end 12B is connected to the frame 30 via a fourth connection 34 allowing a relative rotation around a fourth axis A4 parallel to the first axis A1 and prohibiting any translation perpendicular to the fourth axis A4. The fourth axis A4 is immobile.

The first axis A1, the second axis A2, the third axis A3 and the fourth axis A4 are separate from and parallel to one another.

In one embodiment, the third connection 32 and the fourth connection 34 are ball joints, the centers of which are respectively located on the third axis A3 and the fourth axis A4.

Alternatively, the third connection 32 is an annular linear connection, the axis of translation of which is the third axis A3, or a pivot link or a sliding pivot link, the axis of rotation, and if applicable translation, of which is the third axis A3.

Alternatively, the fourth connection 34 is an annular linear connection, the axis of translation of which is the fourth axis A4, or a pivot link or a sliding pivot link, the axis of rotation, and if applicable translation, of which is the fourth axis A4.

The second portion 4B of the shaft 4 moves during the operation of the moving device 8. The third axis A3 and the fourth axis A4 are immobile relative to the frame 30. Their positions are invariable during the operation of the moving device 8.

When the shaft 4 is idle, the first cylinder axis T1 intersects the first axis A1 and the third axis A3, and the second cylinder axis T2 intersects the second axis A2 and the fourth axis A4.

The first cylinder 10 and the second cylinder 12 converge toward one another toward the first axis A1. The distance between the first axis A1 and the second axis A2 is strictly smaller than the distance between the third axis A3 and the fourth axis A4.

The connecting ends 10A, 12A of the first cylinder 10 and the second cylinder 12 connected to the connecting device 14 are closer to one another than the opposite connecting ends 10B, 12B of the first cylinder 10 and the second cylinder 12 mounted respectively rotating around the third axis A3 and the fourth axis A4.

The first cylinder 10 and the second cylinder 12 each comprise a cylinder body 36 and a cylinder rod 38 sliding relative to the cylinder body 36, respectively along the first cylinder axis T1 and the second cylinder axis T2.

One connecting end 10A, 12A of each of the first cylinder 10 and the second cylinder 12 is the end of the cylinder rod 38 of this cylinder opposite the cylinder body 36 of this cylinder, the other connecting end 10B, 12B of each of the first cylinder 10 and the second cylinder 12 being the end of the cylinder body 36 of this cylinder opposite the cylinder rod 38.

The cylinder rod 38 of each of the first cylinder 10 and the second cylinder 12 is connected to the connecting device 14 and the cylinder body 36 of each of the first cylinder 10 and the second cylinder 12 is mounted rotating around a stationary axis A3, A4. Alternatively, the configuration of the first cylinder 10 and/or the configuration of the second cylinder 12 is reversed.

In one embodiment, the first cylinder 10 and the second cylinder 12 are hydraulic cylinders. A hydraulic cylinder uses a pressurized liquid to move a piston inside the cylinder body, the cylinder rod being secured to the piston.

In another embodiment, the first cylinder 10 and the second cylinder 12 are electric cylinders. An electric cylinder for example uses a screw/nut assembly and an electric motor to rotate the screw and the nut relative to one another and translate the cylinder rod relative to the cylinder body.

As illustrated in FIGS. 1 and 2, the immobilizing device 6 comprises a support 40 bearing a pebble 42 sintered on a step of the shaft 4 intended to receive a railway vehicle wheel, the pebble 42 being mounted stationary on the support 40. "Sintered" means that the pebble 42 is fitted with gripping on the step of the shaft 4 intended to receive the wheel. In one possible alternative, the pebble 42 is replaced by a wheel. Using a pebble 42 or a wheel mounted on the shaft makes it possible to reform the usage conditions of the shaft 4, in particular with the stresses generated at the shaft/wheel interface.

As illustrated in FIGS. 1 and 2, the frame 30 here assumes the form of a plate, also called "surface plate". The support 40 assumes the form of a strut extending upward from the frame 30 and bearing the pebble 42 at its upper end. Other frames 30 and other immobilizing devices 6 can be considered.

Furthermore, as illustrated in FIGS. 1 and 2, the shaft 4 here has too small an outer diameter to cooperate directly with the connecting device 14.

The device 2 comprises a diameter-enlarging adapter 44, the connecting device 14 being mounted on the shaft 4 via the adapter 44. The adapter 44 has an orifice for receiving the shaft 4 and a cylindrical step for receiving the connecting device 14, the step having an outer diameter strictly larger than the inner diameter of the orifice.

The adapter 44 here assumes the form of a tubular sleeve slipped on the shaft 4, the end-piece 24 of the connecting device 14 being mounted on the adapter 44.

Figure 3:
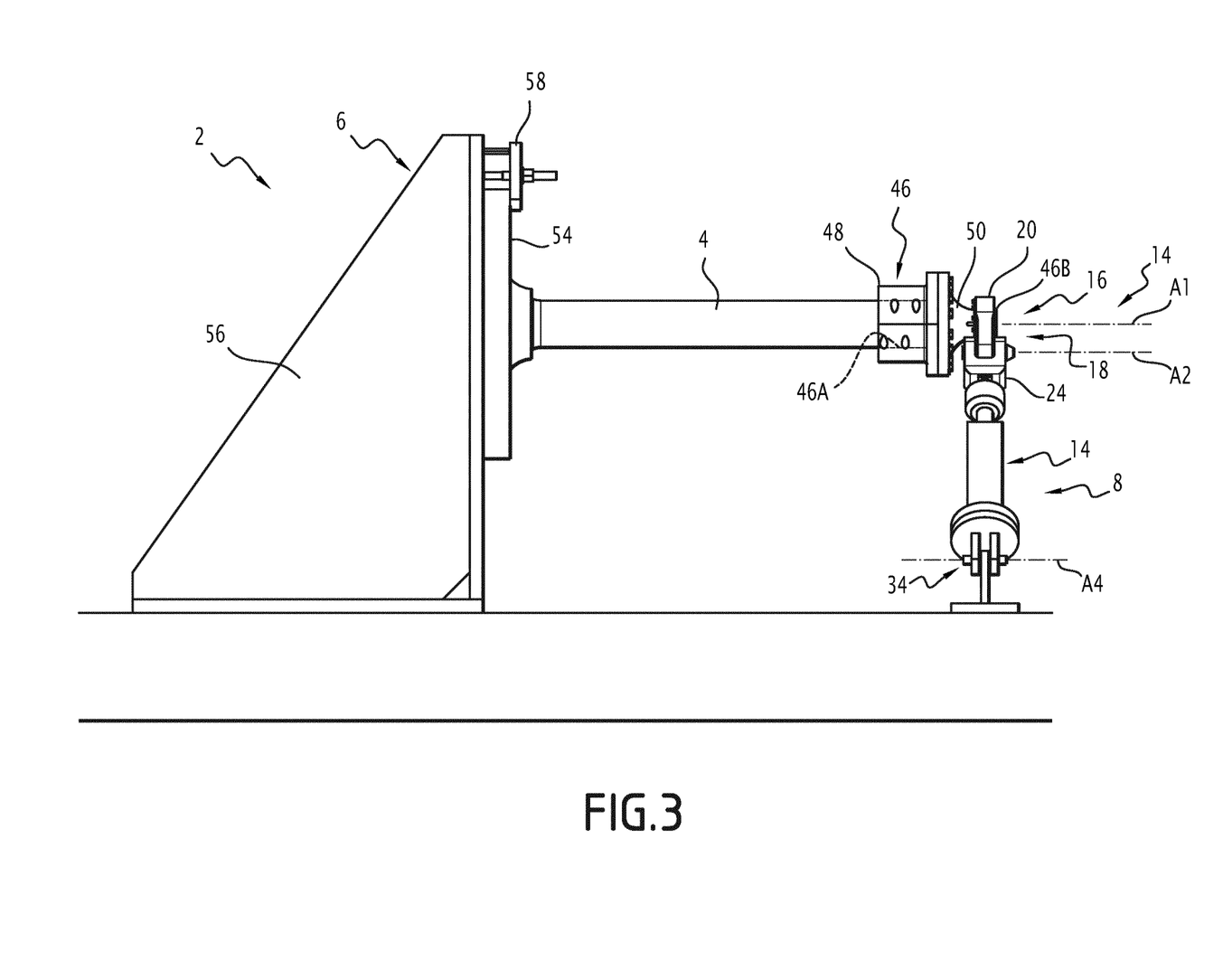
FIGS. 3 and 4 are side and front views of another device for testing the bending of a shaft and/or a mechanical part mounted on the shaft.
Figure 4:
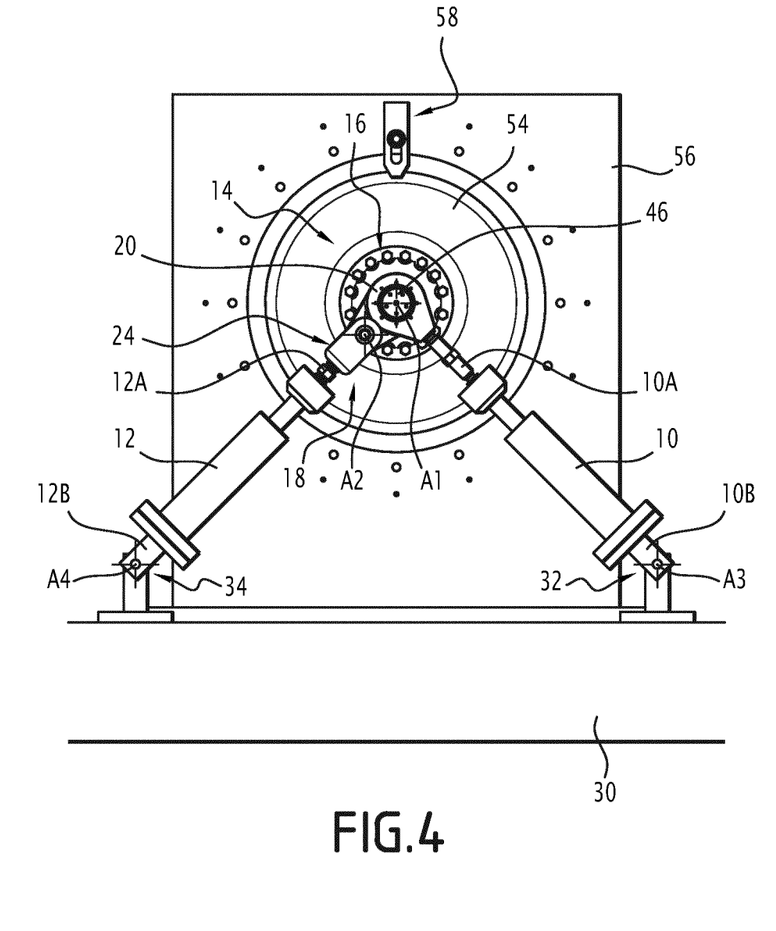

The device 2 illustrated in FIGS. 3 and 4 differs from that of FIGS. 1 and 2 in that it is configured to test the bending of a shaft 4 having an outer diameter that is too large to cooperate directly with the connecting device 14.

The device 2 comprises a diameter-reducing adapter 46, the connecting device 14 being mounted on the shaft 4 via the adapter 46. The adapter 46 comprises an orifice 46A for receiving the shaft 4 and an outer cylindrical step 46B for receiving the connecting device 14, the step 46B having an outer diameter strictly smaller than the inner diameter of the orifice 46.

The adapter 46 here comprises a tubular sleeve 48 having the orifice 46A and a pilot point 50 extending axially from the sleeve 48 and bearing the step 46B.

Furthermore, the immobilizing device 6 of the device 2 of FIGS. 3 and 4 differs from that of FIGS. 1 and 2 in that it is suitable for immobilizing a railway vehicle bogie axle shaft 4 having a railway vehicle wheel 54 fitted with gripping on one end of the shaft 4, more specifically on a step of the shaft 4 intended to receive a wheel.

To that end, the immobilizing device 6 comprises a support 56 and a plurality of flanges 58 distributed in a circle and provided to grip the peripheral edge of the wheel 54. A single flange 58 is shown in FIGS. 3 and 4 for clarity reasons. The flanges 58 here are screwed in tapped orifices of the support 56.

Seen along the first axis A1 (FIGS. 2 and 4), the first cylinder axis T1 and the line segment connecting the first axis A1 and the second axis A2 form an angle comprised between 0 and 180° between them. Preferably, this angle is approximately equal to 90°.

Seen along the first axis A1 (FIGS. 2 and 4), the second axis A2 is located substantially between the first axis A1 and the fourth axis A4. The line segment connecting the first axis A1 and the second axis A2, on the one hand, and the line segment connecting the second axis A2 and the fourth axis A4, on the other hand, form an angle comprised between 90° and 180°, preferably an angle comprised between 120° and 180°.

During operation, the first cylinder 10 and the second cylinder 12 are commanded to move the second portion 4B of the shaft 4 along a trajectory located in the movement plane P (parallel to the plane of FIGS. 2 and 4). To perform bending fatigue tests, the trajectory is for example a circular trajectory centered on the first axis A1 along which the shaft 4 extends when idle.

A test method comprises installing the shaft 4 on the device 2, reading the dimensions of the movement device 8, calculating control laws of the first cylinder 10 and the second cylinder 12 based on the measured dimensions and the desired trajectory, then commanding the first cylinder 10 and the second cylinder 12 based on the calculated control laws, so as to move the second portion 4B of the shaft 4 along the desired trajectory.

The installation of the shaft 4 on the device 2 comprises immobilizing the first portion 4A of the shaft 4 using the immobilizing device 6 and mounting the connecting device 14 on the second portion 4B of the shaft 4.

During a bending fatigue test, the trajectory of the second portion 4B of the shaft 4 is repeated cyclically, with a predetermined number of cycles. Typically, for a railway vehicle bogie axle shaft 4, the number of cycles is greater than or equal to $10^7$.

FIGS. 5 to 8 are kinematic perspective diagrams of devices for testing the bending of a shaft and/or a mechanical part mounted on the shaft.

FIG. 5 shows the kinematic diagram of the device of FIGS. 1 to 4. The third connection 32 and the fourth connection 34 are each a ball joint. Alternatively, the third connection is a pivot link allowing a rotation around the third axis A3 and/or the fourth connection is a pivot link allowing a rotation around the fourth axis A4.

Figure 6:
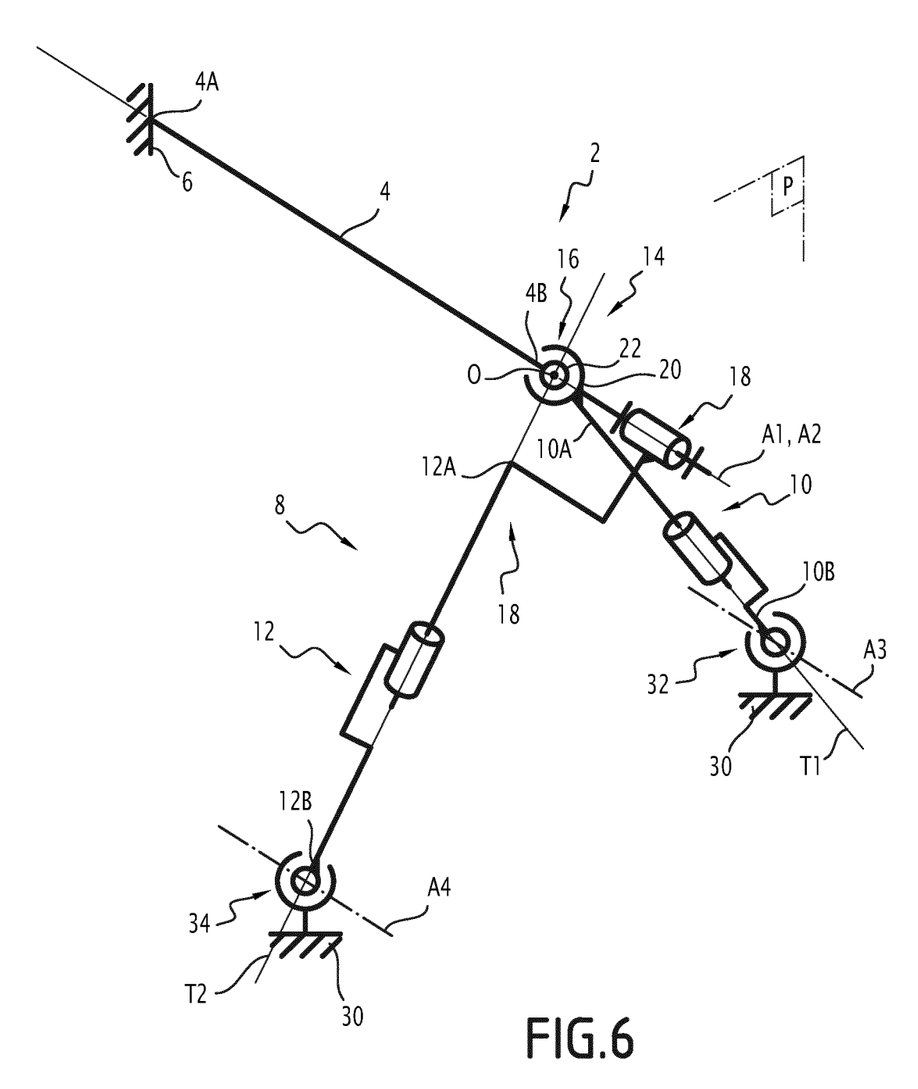
Figure 7:
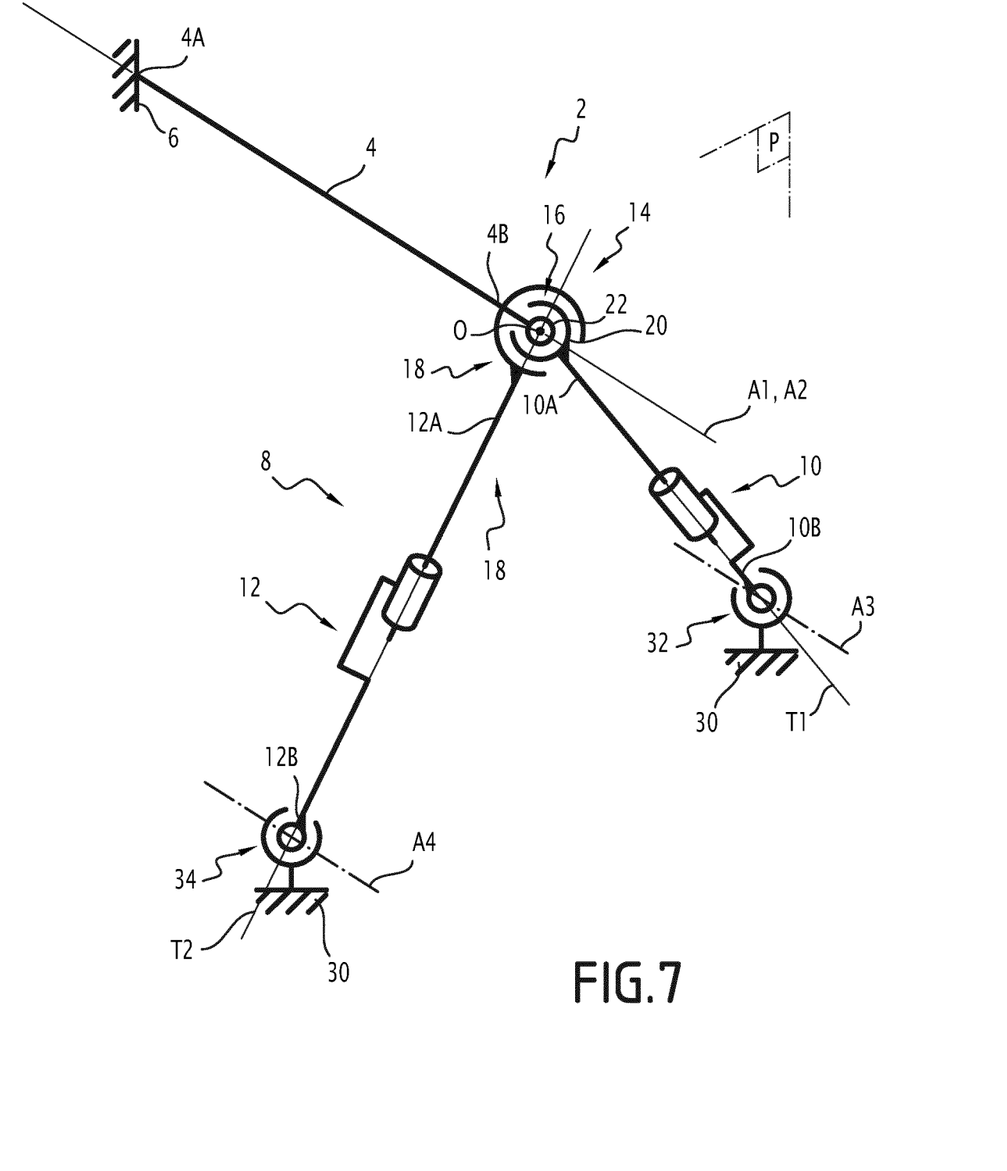
Figure 8:
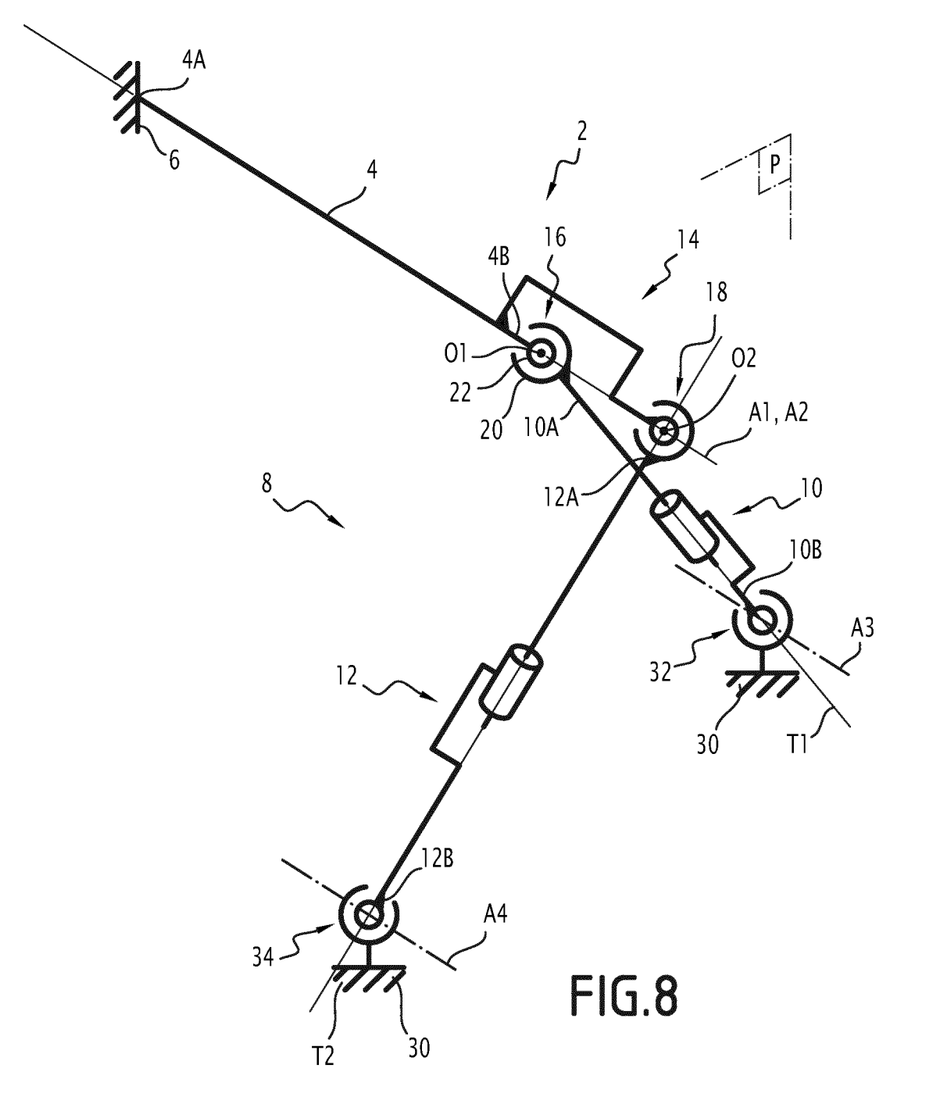

FIGS. 6 to 8 show alternative embodiments of FIGS. 1 to 6.

FIG. 6 shows a kinematic diagram of an alternative in which the second axis A2 is combined with the first axis A1. The first cylinder axis T1 and the second cylinder axis T2 here are substantially coplanar. They are aligned with one another along the first axis A1. Alternatively, they are offset relative to one another along the first axis A1.

The first axis A1, the first cylinder axis T1 and the second cylinder axis here are concurrent.

FIG. 7 shows a kinematic diagram of an alternative in which the second link 18 is a ball joint between the second cylinder 12 and the shaft 4.

In one embodiment, the first connection 16 and the second connection 18 have the same center of rotation O. To that end, it is possible to provide a single ball joint and two parts each defining a respective portion of the ball housing, the two parts connected to one another by a pivot link allowing a rotation around the first axis A1, one part being rigidly connected to the end 10A of the first cylinder 10 and the other part being rigidly mounted at the end 12A of the second cylinder 12.

The first axis A1, the first cylinder axis T1 and the second cylinder axis here are concurrent.

FIG. 8 shows a kinematic diagram of an alternative that differs from that of FIG. 7 in that the first connection 16 and the second connection 18 have separate centers of rotation O1, O2.

In practice, to produce such an alternative, it is possible for the end 12A of the second cylinder 12 to be fastened on the shaft 4 similarly to the end 10A of the first cylinder 10, but with an offset along the shaft 4.

The connecting device 14 for example comprises, to form the second connection 18, a ball end-piece similar to the first ball end-piece 20 of the first connection of FIGS. 1 to 4.

In one embodiment, the shaft 4 traverses a ball joint of the first connection 16 and the end 12A of the second cylinder 12 is connected to the segment of the shaft exceeding the ball joint of the first connection 16.

The device 2 makes it possible to move the end of the shaft along a predetermined trajectory, in a controlled and reliable manner. It is thus possible to conduct tests, and in particular bending fatigue tests, that are reliable.

The device 2 is easy to implement. Size readings taken on the moving device, once the shaft 4 is installed, allow easy calculation of the control laws of the first cylinder and the second cylinder to obtain the desired trajectory.

Using cylinders makes it possible to control the forces applied on the shaft, and thus to better control the test parameters.

Using cylinders in particular makes it possible to carry out particular cycles reproducing the actual usage conditions of a railway axle.

Indeed, in practice, the urging of the axle to bend for example varies depending on the load of the railway vehicle and/or the profile of the railway track (straight line, curve, superelevation, etc.). Using cylinders for example makes it possible to simulate particular sequences of straight lines and curves.

Above, we have described the bending test of a shaft. However, the device 2 makes it possible to test the shaft and/or a mechanical part fitted on the shaft, such as a pebble (FIGS. 1 and 2) or a railway vehicle wheel (FIGS. 3 and 4). The pebble may for example be used to test a particular type of railway vehicle wheel hub, without testing an entire wheel.

Testing a pebble or a wheel by urging bending of the shaft makes it possible to reproduce the operating conditions of a railway vehicle axle, and in particular the interaction between the shaft and the pebble or the wheel fitted on the shaft.

The invention is not limited to the embodiments and alternatives described above. Other embodiments and alternatives can be considered.

For example, in FIGS. 1 to 8, the first axis A1 is horizontal and the movement plane is vertical. Alternatively, the first axis A1 is vertical and the movement plane is horizontal.

What is claimed is:

1. A device for testing a shaft and/or a mechanical part mounted on the shaft, the device comprising an immobilizing device to immobilize a first portion of the shaft, the immobilized and idle shaft extending along a first axis, and a movement device for moving a second portion of the shaft substantially perpendicular to the first axis, so as to load the shaft in bending, wherein the moving device comprises a first cylinder arranged along a first cylinder axis substantially perpendicular to the first axis, a second cylinder arranged along a second cylinder axis substantially perpendicular to the first axis, and a connecting device for connecting the first cylinder and the second cylinder to the shaft, wherein the connecting device is configured to form, between the shaft and one end of the first cylinder, a first connection prohibiting a relative translation perpendicular to the first axis and allowing a relative rotation around the first axis, and to form, between the shaft and one end of the second cylinder or between the end of the first cylinder connected to the shaft and one end of the second cylinder, a second connection prohibiting a relative translation perpendicular to the first axis and allowing a relative rotation around a second axis parallel to the first axis or coincides with the first axis, and wherein the first connection is:
- a ball joint, the center of rotation of which is located on the first axis,
- an annular linear connection, the center of translation of which is the first axis and the center of rotation of which is located on the first axis,
- a pivot link, the axis of rotation of which is the first axis, or
- a sliding pivot link, the axis of rotation and translation of which is the first axis.

2. The device according to claim 1, wherein the first connection comprises an end-piece rigidly connected to one end of the first cylinder, the end-piece defining a ball joint housing receiving a ball intended to be mounted on the shaft while being centered on the first axis.

3. The device according to claim 1, wherein the second axis is separate from the first axis.

4. The device according to claim 1, wherein the second axis coincides with the first axis.

5. The device according to claim 1, wherein the second connection is a pivot link, the axis of rotation of which is the second axis.

6. The device according to claim 1, wherein the second connection is a ball joint or an annular linear connection.

7. The device according to claim 1, wherein, the shaft being idle, the first cylinder axis intersects the first axis and/or the second cylinder axis intersects the first axis.

8. The device according to claim 1, comprising at least one adapter comprising an orifice to receive the second portion of the shaft and a cylindrical step for mounting the connecting device, the cylindrical step having an outer diameter strictly larger or strictly smaller than the inner diameter of the orifice.

9. The device according to claim 1, wherein the immobilizing device is configured to immobilize the mechanical part mounted on the first portion of the shaft.

10. The device according to claim 9, wherein the mechanical part is a pebble or a railway vehicle wheel fitted on the first portion.

11. A method to test the bending of a shaft and/or to test a mechanical part mounted on the shaft comprising providing the device according to claim 1.

12. The method according to claim 11 further, comprising:
- installing the shaft on the device,
- reading dimensions of the movement device, the shaft being idle,
- calculating control laws of the first cylinder and the second cylinder based on the read dimensions and a desired trajectory of the second portion of the shaft, and
- controlling the first cylinder and the second cylinder based on the calculated control laws.

13. The method according to claim 11, wherein the shaft is a railway vehicle bogie axle shaft.

14. The method according to claim 11 wherein the mechanical part is a pebble or a wheel fitted on the shaft.

* * * * *